(12) United States Patent
Chang et al.

(10) Patent No.: US 11,579,379 B2
(45) Date of Patent: Feb. 14, 2023

(54) FIBER OPTIC ADAPTER ASSEMBLY

(71) Applicant: Senko Advanced Components, Inc., Marlborough, MA (US)

(72) Inventors: Jimmy Chang, Worcester, MA (US); Kazuyoshi Takano, Tokyo (JP); Paul Newbury, Ashland, MA (US)

(73) Assignee: Senko Advanced Components, Inc., Hudson (MA)

( * ) Notice: Subject to any disclaimer, the term of this patent is extended or adjusted under 35 U.S.C. 154(b) by 145 days.

(21) Appl. No.: 16/835,277

(22) Filed: Mar. 30, 2020

(65) Prior Publication Data

US 2020/0310048 A1    Oct. 1, 2020

Related U.S. Application Data

(60) Provisional application No. 62/825,778, filed on Mar. 28, 2019.

(51) Int. Cl.
*G02B 6/38* (2006.01)
*G02B 6/42* (2006.01)

(52) U.S. Cl.
CPC .......... *G02B 6/3893* (2013.01); *G02B 6/3821* (2013.01); *G02B 6/3825* (2013.01); *G02B 6/3879* (2013.01); *G02B 6/3897* (2013.01); *G02B 6/4284* (2013.01); *G02B 6/4292* (2013.01)

(58) Field of Classification Search
CPC .. G02B 6/3821; G02B 6/3825; G02B 6/3897; G02B 6/4284; G02B 6/4292
See application file for complete search history.

(56) References Cited

U.S. PATENT DOCUMENTS

| | | | |
|---|---|---|---|
| 3,721,945 | A | 3/1973 | Hults |
| 4,150,790 | A | 4/1979 | Potter |
| 4,312,564 | A | 1/1982 | Cefarelli |
| 4,327,964 | A | 5/1982 | Haesly |
| 4,478,473 | A | 10/1984 | Frear |
| 4,762,388 | A * | 8/1988 | Tanaka ................. G02B 6/3893 D13/133 |

(Continued)

FOREIGN PATENT DOCUMENTS

| | | |
|---|---|---|
| CA | 2495693 A1 | 4/2004 |
| CN | 2836038 Y | 11/2006 |

(Continued)

OTHER PUBLICATIONS

International Search Report and Written Opinion, Application No. PCT/US20/25849, dated Aug. 26, 2020, pp. 11.

(Continued)

*Primary Examiner* — Sung H Pak
*Assistant Examiner* — Hoang Q Tran

(57) ABSTRACT

A fiber optic adapter assembly reduced in size from a SFP footprint to a SC footprint to accommodate a first fiber optic connector on a first side within one or more ports, and a second fiber optic connector on a second side within one or more ports. The first fiber optic connector is a duplex fiber optic connector with an overall length of about 50 mm and the second fiber optic connector is a behind-the-wall connector with an overall length of about 15 mm thereby reducing the overall length of a connector and adapter assembly for increasing optical fiber density.

12 Claims, 13 Drawing Sheets

(56) References Cited

U.S. PATENT DOCUMENTS

| | | |
|---|---|---|
| 4,764,129 A | 8/1988 | Jones |
| 4,840,451 A | 6/1989 | Sampson |
| 4,872,736 A | 10/1989 | Myers |
| 4,979,792 A | 12/1990 | Weber |
| 5,026,138 A | 6/1991 | Boudreau |
| 5,041,025 A | 8/1991 | Haitmanek |
| D323,143 S | 1/1992 | Ohkura et al. |
| D333,504 S | 2/1993 | Myojo |
| 5,212,752 A | 5/1993 | Stephenson |
| 5,265,181 A | 11/1993 | Chang |
| 5,289,554 A | 2/1994 | Cubukciyan |
| 5,317,663 A | 5/1994 | Beard |
| 5,335,301 A | 8/1994 | Newman |
| 5,348,487 A | 9/1994 | Marazzi |
| 5,414,790 A | 5/1995 | Lee |
| 5,444,806 A | 8/1995 | de Marchi |
| 5,481,634 A | 1/1996 | Anderson |
| 5,506,922 A | 4/1996 | Grois |
| 5,521,997 A | 5/1996 | Rovenolt |
| 5,553,180 A | 9/1996 | Belenkiy et al. |
| 5,570,445 A | 10/1996 | Chou |
| 5,588,079 A | 12/1996 | Tanabe |
| 5,602,951 A | 2/1997 | Shiota |
| 5,684,903 A | 11/1997 | Kyomasu |
| 5,687,268 A | 11/1997 | Stephenson |
| 5,781,681 A | 7/1998 | Manning |
| 5,845,036 A | 12/1998 | De Marchi |
| 5,915,987 A | 6/1999 | Reed |
| 5,937,121 A | 8/1999 | Ott et al. |
| 5,937,130 A | 8/1999 | Amberg |
| 5,956,444 A | 9/1999 | Duda |
| 5,971,626 A | 10/1999 | Knodell |
| 6,041,155 A | 3/2000 | Anderson |
| 6,049,040 A | 4/2000 | Biles |
| 6,134,370 A | 10/2000 | Childers |
| 6,178,283 B1 | 1/2001 | Weigel |
| RE37,080 E | 3/2001 | Stephenson |
| 6,206,577 B1 | 3/2001 | Hall, III |
| 6,206,581 B1 | 3/2001 | Driscoll |
| 6,227,717 B1 | 5/2001 | Ott |
| 6,238,104 B1 | 5/2001 | Yamakawa |
| 6,247,849 B1 | 6/2001 | Liu |
| 6,250,817 B1 | 6/2001 | Lampert |
| 6,276,840 B1 | 8/2001 | Weiss |
| 6,364,537 B1 | 4/2002 | Maynard |
| 6,371,657 B1 | 4/2002 | Chen |
| 6,379,052 B1 | 4/2002 | de Jong |
| 6,422,759 B1 | 7/2002 | Kevern |
| 6,461,054 B1 | 10/2002 | Iwase |
| 6,471,412 B1 | 10/2002 | Belenkiy |
| 6,478,472 B1 | 11/2002 | Anderson |
| 6,485,194 B1 | 11/2002 | Shirakawa |
| 6,530,696 B1 | 3/2003 | Ueda |
| 6,551,117 B2 | 4/2003 | Poplawski |
| 6,565,262 B2 | 5/2003 | Childers |
| 6,579,014 B2 | 6/2003 | Melton |
| 6,585,194 B1 | 7/2003 | Brushwood |
| 6,634,796 B2 | 10/2003 | de Jong |
| 6,634,801 B1 | 10/2003 | Waldron |
| 6,648,520 B2 | 11/2003 | McDonald |
| 6,668,113 B2 | 12/2003 | Togami |
| 6,682,228 B2 | 1/2004 | Rathnam |
| 6,685,362 B2 | 2/2004 | Burkholder |
| 6,695,486 B1 | 2/2004 | Falkenberg |
| 6,705,765 B2 | 3/2004 | Lampert |
| 6,854,894 B1 | 2/2005 | Yunker |
| 6,869,227 B2 | 3/2005 | Del Grosso |
| 6,872,039 B2 | 3/2005 | Baus |
| 6,935,789 B2 | 8/2005 | Gross, III |
| 7,036,993 B2 | 5/2006 | Luther |
| 7,052,186 B1 | 5/2006 | Bates |
| 7,077,576 B2 | 7/2006 | Luther |
| 7,090,406 B2 | 8/2006 | Melton |
| 7,090,407 B2 | 8/2006 | Melton |
| 7,091,421 B2 | 8/2006 | Kukita |
| 7,111,990 B2 | 9/2006 | Melton |
| 7,113,679 B2 | 9/2006 | Melton |
| D533,504 S | 12/2006 | Lee |
| D534,124 S | 12/2006 | Taguchi |
| 7,150,567 B1 | 12/2006 | Luther |
| 7,153,041 B2 | 12/2006 | Mine |
| 7,198,409 B2 | 4/2007 | Smith |
| 7,207,724 B2 | 4/2007 | Gurreri |
| D543,146 S | 5/2007 | Chen et al. |
| 7,258,493 B2 | 8/2007 | Milette |
| 7,264,402 B2 | 9/2007 | Theuerkorn |
| 7,281,859 B2 | 10/2007 | Mudd |
| D558,675 S | 1/2008 | Chien et al. |
| 7,315,682 B1 | 1/2008 | En Lin |
| 7,325,976 B2 | 2/2008 | Gurreri |
| 7,325,980 B2 | 2/2008 | Pepe |
| 7,329,137 B2 | 2/2008 | Martin |
| 7,331,718 B2 | 2/2008 | Yazaki |
| 7,354,291 B2 | 4/2008 | Caveney |
| 7,371,082 B2 | 5/2008 | Zimmel |
| 7,387,447 B2 | 6/2008 | Mudd |
| 7,390,203 B2 | 6/2008 | Murano |
| D572,661 S | 7/2008 | En Lin et al. |
| 7,431,604 B2 | 10/2008 | Waters |
| 7,463,803 B2 | 12/2008 | Cody |
| 7,465,180 B2 | 12/2008 | Kusuda |
| 7,473,124 B1 | 1/2009 | Briant |
| 7,510,335 B1 | 3/2009 | Su |
| 7,513,695 B1 | 4/2009 | Lin |
| 7,540,666 B2 | 6/2009 | Luther |
| 7,561,775 B2 | 7/2009 | Lin |
| 7,588,373 B1 | 9/2009 | Sato |
| 7,591,595 B2 | 9/2009 | Lu |
| 7,594,766 B1 | 9/2009 | Sasser |
| 7,641,398 B2 | 1/2010 | O'Riorden |
| 7,695,199 B2 | 4/2010 | Teo |
| 7,699,533 B2 | 4/2010 | Milette |
| 7,712,970 B1 | 5/2010 | Lee |
| 7,824,113 B2 | 11/2010 | Wong |
| 7,837,395 B2 | 11/2010 | Lin |
| 7,903,922 B2 | 3/2011 | Momotsu |
| D641,708 S | 7/2011 | Yamauchi |
| 8,083,450 B1 | 12/2011 | Smith |
| 8,152,385 B2 | 4/2012 | de Jong |
| 8,186,890 B2 | 5/2012 | Lu |
| 8,192,091 B2 | 6/2012 | Hsu |
| 8,202,009 B2 | 6/2012 | Lin |
| 8,221,007 B2 | 7/2012 | Peterhans |
| 8,251,733 B2 | 8/2012 | Wu |
| 8,267,595 B2 | 9/2012 | Lin |
| 8,270,796 B2 | 9/2012 | Nhep |
| 8,408,815 B2 | 4/2013 | Lin |
| 8,465,317 B2 | 6/2013 | Gniadek |
| 8,534,928 B2 | 9/2013 | Cooke |
| 8,556,645 B2 | 10/2013 | Crain |
| 8,559,781 B2 | 10/2013 | Childers |
| 8,622,634 B2 | 1/2014 | Arnold |
| 8,636,424 B2 | 1/2014 | Kuffel |
| 8,651,749 B2 | 2/2014 | Dainese Júnior |
| 8,676,022 B2 | 3/2014 | Jones |
| 8,678,670 B2 | 3/2014 | Takahashi |
| 8,727,638 B2 | 5/2014 | Lee |
| 8,770,863 B2 | 7/2014 | Cooke |
| 9,052,474 B2 | 6/2015 | Jiang |
| 9,188,747 B2 | 11/2015 | Gniadek |
| 9,250,402 B2 | 2/2016 | Ishii |
| 9,304,263 B2 | 4/2016 | Youngkin |
| 9,310,569 B2 | 4/2016 | Lee |
| 9,329,644 B2 | 5/2016 | Wang |
| 9,366,829 B2 | 6/2016 | Czosnowski |
| 9,411,110 B2 | 8/2016 | Barnette, Jr. |
| 9,465,172 B2 | 10/2016 | Shih |
| 9,494,744 B2 | 11/2016 | de Jong |
| 9,548,557 B2 | 1/2017 | Liu |
| 9,551,842 B2 | 1/2017 | Theuerkorn |
| 9,557,495 B2 | 1/2017 | Raven |
| 9,568,686 B2 | 2/2017 | Fewkes |
| 9,581,768 B1 | 2/2017 | Baca |
| 9,599,778 B2 | 3/2017 | Wong |

(56) References Cited

U.S. PATENT DOCUMENTS

| | | |
|---|---|---|
| 9,658,409 B2 | 5/2017 | Gniadek |
| 9,684,130 B2 | 6/2017 | Veatch |
| 9,684,134 B2 | 6/2017 | Anderson et al. |
| 9,684,136 B2 | 6/2017 | Cline |
| 9,684,313 B2 | 6/2017 | Chajec |
| 9,709,753 B1 | 7/2017 | Chang |
| 9,726,830 B1 | 8/2017 | Gniadek |
| 9,778,425 B2 | 10/2017 | Nguyen |
| 9,829,645 B2 | 11/2017 | Good |
| 9,829,653 B1 * | 11/2017 | Nishiguchi .......... G02B 6/3825 |
| 9,869,825 B2 | 1/2018 | Bailey |
| 9,880,361 B2 | 1/2018 | Childers |
| 9,946,035 B2 | 4/2018 | Gustafson |
| 9,948,370 B2 | 4/2018 | Seok |
| 9,971,103 B2 | 5/2018 | de Jong |
| 10,031,296 B2 | 7/2018 | Good |
| 2002/0168148 A1 | 11/2002 | Gilliland |
| 2002/0172467 A1 | 11/2002 | Anderson |
| 2002/0191919 A1 | 12/2002 | Nolan |
| 2003/0053787 A1 | 3/2003 | Lee |
| 2003/0063862 A1 | 4/2003 | Fillion |
| 2003/0095754 A1 | 5/2003 | Matsumoto |
| 2003/0157825 A1 | 8/2003 | Kane |
| 2004/0013369 A1 * | 1/2004 | Coffey ................. G02B 6/4292 385/53 |
| 2004/0052473 A1 | 3/2004 | Seo |
| 2004/0109646 A1 | 6/2004 | Anderson |
| 2004/0136657 A1 | 7/2004 | Ngo |
| 2004/0141693 A1 | 7/2004 | Szilagyi |
| 2004/0161958 A1 | 8/2004 | Togami |
| 2004/0234209 A1 | 11/2004 | Cox |
| 2004/0247252 A1 | 12/2004 | Ehrenreich |
| 2005/0111796 A1 | 5/2005 | Matasek |
| 2005/0141817 A1 | 6/2005 | Yazaki |
| 2006/0013539 A1 | 1/2006 | Thaler |
| 2006/0089049 A1 | 4/2006 | Sedor |
| 2006/0127025 A1 | 6/2006 | Haberman |
| 2006/0160429 A1 | 7/2006 | Dawiedczyk |
| 2006/0269194 A1 | 11/2006 | Luther |
| 2006/0274411 A1 | 12/2006 | Yamauchi |
| 2007/0025665 A1 | 2/2007 | Dean |
| 2007/0028409 A1 | 2/2007 | Yamada |
| 2007/0079854 A1 | 4/2007 | You |
| 2007/0098329 A1 | 5/2007 | Shimoji |
| 2007/0149062 A1 | 6/2007 | Long |
| 2007/0230874 A1 | 10/2007 | Lin |
| 2007/0232115 A1 | 10/2007 | Burke |
| 2007/0243749 A1 | 10/2007 | Wu |
| 2008/0008430 A1 | 1/2008 | Kewitsch |
| 2008/0044137 A1 | 2/2008 | Luther |
| 2008/0056647 A1 | 3/2008 | Margolin |
| 2008/0069501 A1 | 3/2008 | Mudd |
| 2008/0101757 A1 | 5/2008 | Lin |
| 2008/0226237 A1 | 9/2008 | O'Riorden |
| 2008/0267566 A1 | 10/2008 | En Lin |
| 2009/0022457 A1 | 1/2009 | de Jong |
| 2009/0028507 A1 | 1/2009 | Jones |
| 2009/0034911 A1 | 2/2009 | Murano |
| 2009/0047818 A1 | 2/2009 | Irwin |
| 2009/0092360 A1 | 4/2009 | Lin |
| 2009/0176401 A1 | 7/2009 | Gu |
| 2009/0196555 A1 | 8/2009 | Lin |
| 2009/0214162 A1 | 8/2009 | O'Riorden |
| 2009/0220197 A1 | 9/2009 | Gniadek |
| 2009/0220200 A1 | 9/2009 | Sheau Tung Wong |
| 2009/0290839 A1 | 11/2009 | Lin |
| 2009/0290938 A1 | 11/2009 | Asaoka |
| 2010/0034502 A1 | 2/2010 | Lu |
| 2010/0092136 A1 | 4/2010 | Nhep |
| 2010/0247041 A1 | 9/2010 | Szilagyi |
| 2010/0284656 A1 | 11/2010 | Morra |
| 2010/0322561 A1 | 12/2010 | Un |
| 2011/0044588 A1 | 2/2011 | Larson |
| 2011/0131801 A1 | 6/2011 | Nelson |
| 2011/0155810 A1 | 6/2011 | Taniguchi |
| 2011/0177710 A1 | 7/2011 | Tobey |
| 2011/0239220 A1 | 9/2011 | Gibson |
| 2012/0099822 A1 | 4/2012 | Kuffel |
| 2012/0155810 A1 | 6/2012 | Nakagawa |
| 2012/0189260 A1 | 7/2012 | Kowalczyk |
| 2012/0237177 A1 | 9/2012 | Minota |
| 2012/0269485 A1 | 10/2012 | Haley |
| 2012/0301080 A1 | 11/2012 | Gniadek |
| 2013/1942341 | 1/2013 | Srutkowski |
| 2013/0071067 A1 | 3/2013 | Lin |
| 2013/0089995 A1 | 4/2013 | Gniadek |
| 2013/0094816 A1 | 4/2013 | Lin |
| 2013/0121653 A1 | 5/2013 | Shitama |
| 2013/0170797 A1 | 7/2013 | Ott |
| 2013/0183012 A1 | 7/2013 | Cabanne Lopez |
| 2013/0216185 A1 | 8/2013 | Klavuhn |
| 2013/0216188 A1 | 8/2013 | Lin |
| 2013/0259429 A1 | 10/2013 | Czosnowski |
| 2013/0308915 A1 | 11/2013 | Buff |
| 2013/0322825 A1 | 12/2013 | Cooke |
| 2014/0016901 A1 | 1/2014 | Lambourn |
| 2014/0023322 A1 | 1/2014 | Gniadek |
| 2014/0050446 A1 | 2/2014 | Chang |
| 2014/0056562 A1 | 2/2014 | Limbert |
| 2014/0133808 A1 | 5/2014 | Hill |
| 2014/0219621 A1 | 8/2014 | Barnette, Jr. |
| 2014/0226946 A1 | 8/2014 | Cooke |
| 2014/0241644 A1 | 8/2014 | Kang |
| 2014/0241678 A1 | 8/2014 | Bringuier |
| 2014/0241688 A1 | 8/2014 | Isenhour |
| 2014/0334780 A1 | 11/2014 | Nguyen |
| 2014/0348477 A1 | 11/2014 | Chang |
| 2015/0003788 A1 | 1/2015 | Chen |
| 2015/0111417 A1 | 4/2015 | Vanderwoud |
| 2015/0212282 A1 | 7/2015 | Lin |
| 2015/0301294 A1 | 10/2015 | Chang |
| 2015/0331201 A1 | 11/2015 | Takano |
| 2015/0355417 A1 | 12/2015 | Takano |
| 2015/0370021 A1 | 12/2015 | Chan |
| 2015/0378113 A1 | 12/2015 | Good |
| 2016/0131849 A1 | 5/2016 | Takano |
| 2016/0172852 A1 | 6/2016 | Tamura |
| 2016/0178852 A1 | 6/2016 | Takano |
| 2016/0195682 A1 | 7/2016 | Takano |
| 2016/0259135 A1 | 9/2016 | Gniadek |
| 2016/0266326 A1 | 9/2016 | Gniadek |
| 2016/0291262 A1 | 10/2016 | Chang |
| 2016/0320572 A1 | 11/2016 | Gniadek |
| 2016/0322750 A1 | 11/2016 | Plamondon |
| 2016/0349458 A1 | 12/2016 | Murray |
| 2016/0370545 A1 | 12/2016 | Jiang |
| 2017/0003458 A1 | 1/2017 | Gniadek |
| 2017/0205587 A1 | 7/2017 | Chang |
| 2017/0205590 A1 | 7/2017 | Bailey |
| 2017/0205591 A1 | 7/2017 | Takano |
| 2017/0343740 A1 | 11/2017 | Nguyen |
| 2018/0156988 A1 | 6/2018 | Gniadek et al. |
| 2018/0172923 A1 | 6/2018 | Bauco |

FOREIGN PATENT DOCUMENTS

| | | |
|---|---|---|
| CN | 201383588 Y | 1/2010 |
| CN | 202600189 U | 12/2012 |
| DE | 20200611910 U1 | 4/2007 |
| DE | 102006019335 A1 | 10/2007 |
| EP | 1074868 A1 | 2/2001 |
| EP | 1211537 A2 | 6/2002 |
| EP | 1245980 A2 | 10/2002 |
| EP | 1566674 A1 | 8/2005 |
| GB | 2111240 A | 6/1983 |
| JP | 2009229445 A | 10/2009 |
| JP | 2009276493 A | 11/2009 |
| WO | WO2001079904 A2 | 10/2001 |
| WO | WO2004027485 A1 | 4/2004 |
| WO | WO2008112986 A1 | 9/2008 |
| WO | WO2009135787 A1 | 11/2009 |
| WO | WO2010024851 A2 | 3/2010 |
| WO | WO2012136702 A1 | 10/2012 |
| WO | WO2012162385 A1 | 11/2012 |

(56) References Cited

FOREIGN PATENT DOCUMENTS

| WO | WO2014028527 | A2 | 2/2014 |
|---|---|---|---|
| WO | WO2014182351 | A1 | 11/2014 |
| WO | WO2015191024 | A1 | 12/2015 |
| WO | WO2016148741 | A1 | 9/2016 |

OTHER PUBLICATIONS

European Search Report and Written Opinion dated Mar. 3, 2015 for EP 14187661.
European Search Report and Written Opinion dated Feb. 19, 2015 for EP 14168005.
"Fiber Optic Connectors and Assemblies Catalog" 2009, Huber & Suhner Fiber Optics, Herisau, Switzerland, www.google.co.in/url?sa=t&source=web&cd=63&ved=0CCMQFjACODw&url=http%3A%2F%2Fwww.hubersuhner.com%2Fwrite_rtn_binary.pdf%3Fbinaryid%3D8DBC7DE2EB72D3-15%26binarytype%3D484DAA363AEB7E&ei=ZvcvTujWH4ntrAfH-dXZCg&usg=AFQjCNE1MdC--4avewRJU6IDVc_WYbr0QQ.
"Fiber Optic Interconnect Solutions, Tactical Fiber Optic Connectors, Cables and Termini" 2006, Glenair, Inc., Glendale, California, www.mps-electronics.de/fileadmin/files/MPS-E/Produkte/Katalog/Glenair/Kat-alogGlenairLWL-1110.pdf.
"Fiber Optic Products Catalog" Nov. 2007, Tyco Electronics Corporation, Harrisburg, Pennsylvania, www.ampnetconnect.com/documents/Fiber%20Optics%20Catalog%201107.pdf.
International Search Report and Written Opinion dated Apr. 27, 2012 for PCT/US2011/058799.
International Search Report and Written Opinion dated Aug. 27, 2012 for PCT/US2012/039126.
International Search Report and Written Opinion dated Jan. 16, 2014 for PCT/US2013/54784.
International Search Report and Written Opinion dated Aug. 29, 2014 for PCT/US2014/041500.
International Search Report and Written Opinion dated May 14, 2014 for PCT/US2014/012137.
International Search Report and Written Opinion dated Aug. 21, 2008 for PCT/US2008/057023.
International Preliminary Report on Patentability dated Sep. 14, 2017 from related International Application No. PCT/US2015/059458, International Filing Date Nov. 6, 2015.
International Search Report (ISR) WO2008112986 dated Sep. 15, 2009.
ISR WO2012162385ISR dated Nov. 29, 2012.
ISR WO2014028527ISR dated Jul. 16, 2015.
ISR WO2015191024ISR dated Oct. 9, 2014.
ISR WO2015US57610ISR dated Sep. 22, 2016.
ISR WO2016176083ISR dated May 19, 2016.
ISR WO2016148741 ISR dated Sep. 22, 2016.
Non-Final Office action for U.S. Appl. No. 15/847,875, dated Jun. 1, 2018, 9 pages.
Fiber Optic Connectors Tutorial, 2018, 20 pages.
Fiber Optic Glossary, Feb. 29, 2016, 93 pages.
PCT/IB2018/056133 Written Opinion dated Jan. 3, 2019.
PCT/IB/056133 Search Report dated Jan. 3, 2019.

* cited by examiner

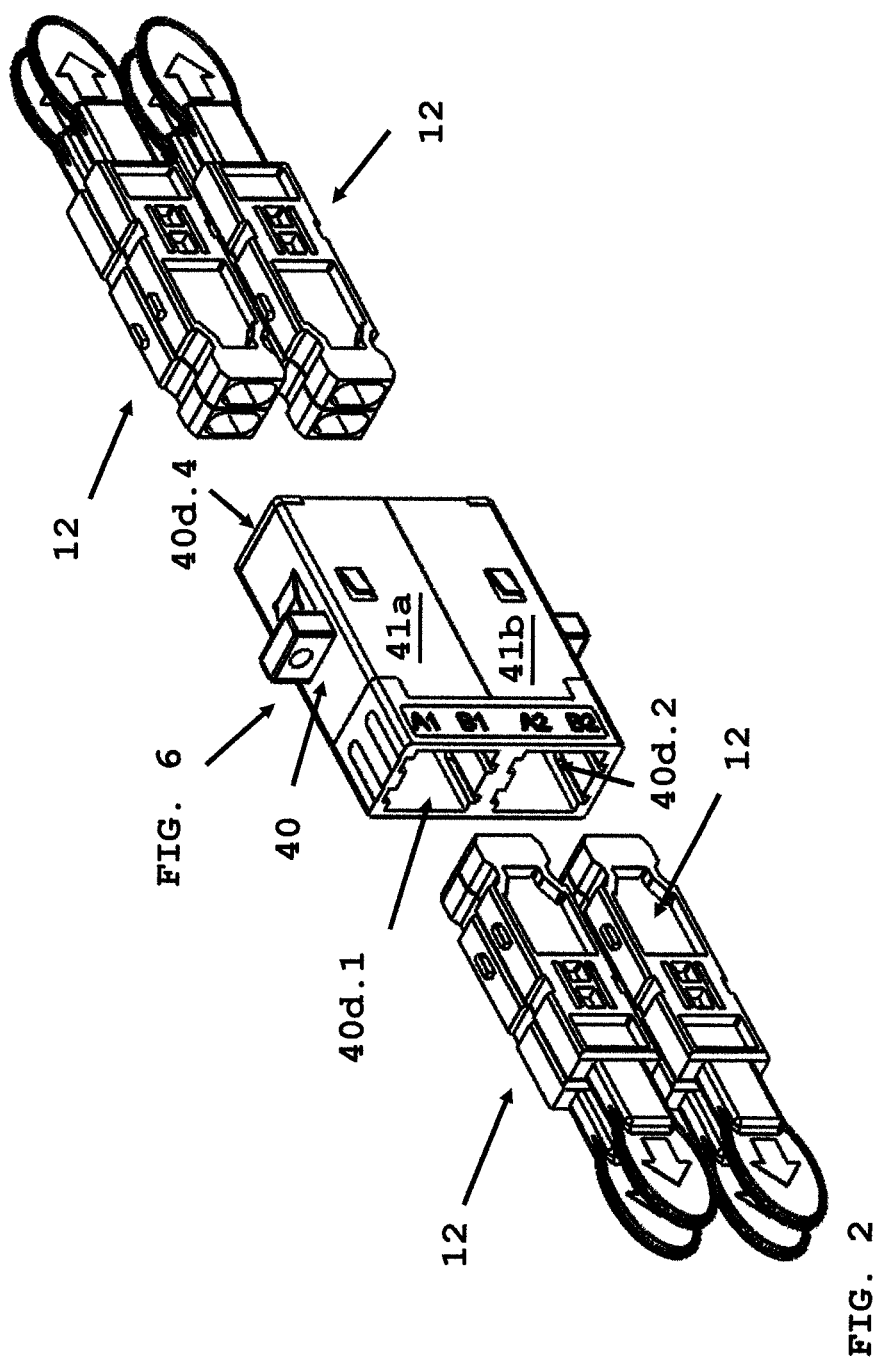

FIBER OPTIC ADAPTER ASSEMBLY

CROSS-REFERENCE TO RELATED APPLICATIONS

This application claims priority to U.S. Provisional Patent Application Ser. No. 62/825,778 filed on Mar. 28, 2019, which is hereby incorporated by reference in it is entirety.

BACKGROUND

The use of fiber optics for communications purposes continues to grow. Data, voice, and other communication networks are increasingly using fiber optics to carry information. Conventional fiber optic cables include optical fibers that conduct light in the transmission of voice, video, and data information. Optical cables have the advantages of large bandwidth and low power loss. Typical applications for optical cables include fiber-to-the-curb (FTTC), fiber-to-the-home (FTTH), fiber-to-the-desk (FTTD), fiber-to-the-antenna (FTTA), plenum, riser, local area networks (LANs), and closed circuit television systems (CCTV).

In a fiber optic network, each individual fiber is generally connected to both a source and a destination device. Additionally, along the fiber optic run between the source and the destination, various connections or couplings may be made on the optical fiber to adjust the length of the fiber. Each connection or coupling requires a connector and adapter to align the fibers such that the light can transmit over the connection without interruption.

Fiber optic connectors of a wide variety of designs have been employed to terminate optical fiber cables and to facilitate connection of the cables to other cables or other optical fiber transmission devices. A typical fiber optic connector includes a ferrule which mounts and centers an optical fiber or fibers within the connector. The ferrule may be fabricated of ceramic or other suitable material. A multi-fiber optic cable is terminated in the connector, and a plurality of individual optical fibers of the cable may be terminated in the ferrule. A popular type of fiber optic cable is a multi-fiber flat, or ribbon cable.

Adapters are configured to accept opposing fiber optic connectors along a longitudinal path formed by opposing ports. A first port and a second port are configured to accept similar fiber optic connectors to form an optical signal pathway for a simplex adapter. A duplex adapter has two ports side-by-side on a first side and two opposing ports on a second side. Each port has internal structure such as hooks, alignment sleeves or cut-outs formed as part of the inner body structure of an outer housing of the adapter body to accept a first fiber optic connector and a second fiber optic connector where the first fiber optic connector opposing the second fiber optic connector may be of the same type of fiber optic connector or dissimilar fiber optic connectors. Each fiber optic connector has at least one ferrule or two ferrules side-by-side with at least one optical fiber therein. A simplex fiber optic connector has one ferrule. A duplex fiber optic connector has two ferrules. A fiber optic connector may have a mechanical transfer ferrule with a plural of optical fibers therein such as twelve (12) or twenty-four (24). Each ferrule is assembled with a ferrule flange and the ferrule itself, and the ferrule is received within an alignment sleeve holder opening. The ferrule assembly comprising the ferrule, ferrule flange, and alignment sleeve holder are all biased by a spring at a distal end of the ferrule assembly.

SUMMARY

In one aspect, a SFP footprint duplex adapter as depicted in FIG. 1, has an adapter outer housing width of about 26.2 mm between the two ports and an overall width of about 30.7 mm with a mounting clip. The mounting clip is placed about the adapter housing thereby allowing the adapter to be secured within a panel. A SFP footprint simplex adapter has an overall width of about 18.0 mm with the mounting clip and the adapter outer housing is about 13.1 mm. When the fiber optic connector is not installed in the port, a dust cap is inserted to help ensure debris do not collect within the adapter port. A pair of SC footprint duplex adapters may be stacked vertically, as shown in FIG. 2, with the mounting clips. Each port may be configured to accept two fiber optic connectors side-by-side, and with a second pair vertically stacked, the adapter is configured a quad adapter. In the present invention, rotating the alignment sleeve holder openings from a vertical to a horizontal position, adding a bridge member between the alignment sleeve holder openings allow the removal of outer housing material, as depicted in FIG. 4, to reduce the overall footprint of the SFP footprint duplex adapter housing from about 13.75 mm to 12 mm along the horizontal side and from 12.45 mm to about 9.50 mm along the vertical side, without the mounting clip. This space savings allows for a higher density configuration within existing panels currently deployed in data warehouses. This aspect of the invention then allows for greater density fiber optic connectors thereby improving data throughput in existing data centers where is not possible to reconfigure the existing data warehouse. This also improves data throughput for new data warehouses. A data warehouse is a plurality of servers that provides data in the form of an optical signal for delivery over the internet.

In another aspect, the adapter housing length along the optical axis is reduced when deploying a behind-the-wall optical connector as depicted in FIG. 8 and FIG. 10. In a data warehouse, adapters are secured within the panel, and the panel reaches from the floor to the ceiling. Each individual panel is moveable along a floor tracking system. The reduced dimensions of the adapter increased the number of movable panels deployed, as part of a larger racking system in a data warehouse.

In another aspect of the invention, a behind-the-wall fiber optic connector comprises an outer housing, ferrule assembly with a ferrule and flange, a bias spring forming the ferrule assembly and an inner body configured to secure to the outer housing. When assembled the inner body and outer housing retains the ferrule assembly the bias spring forming the behind-the-wall connector. In another aspect of this embodiment, the inner body is configured with opposing hooks that are configured to accept a second opposing fiber optic connector. In another aspect of this embodiment, the inner front body has open sidewall. This allows one end of the alignment sleeve holder openings to be partially open thereby reducing the duplex fiber optic connector size. Without the sidewalls, a shelf is provided to hold the ferrule and align it within the alignment sleeve holder opening thereby removing the alignment sleeve as a separate component.

Other aspects and features will be apparent hereinafter.

BRIEF DESCRIPTION OF THE FIGURES

FIG. 2 depicts a set of duplex adapters, similarly configured as depicted in FIG. 6, are stacked vertically forming a quad adapter each configured to accept a pair of duplex fiber optic connectors in each port;

DETAILED DESCRIPTION

Figure 1:
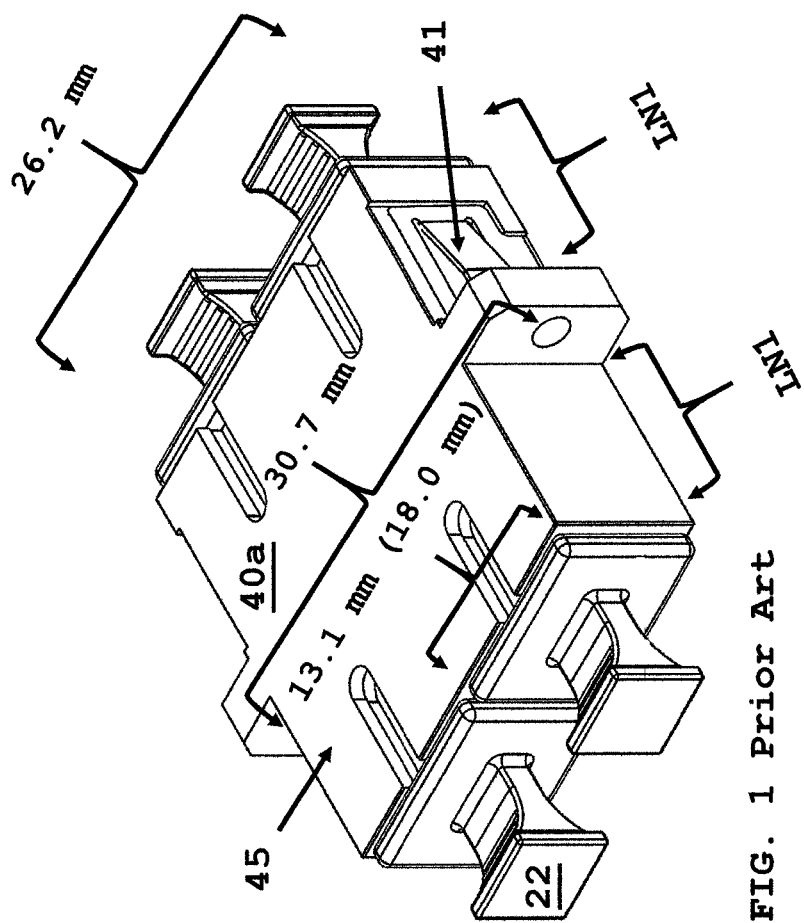
FIG. 1 depicts a prior art duplex adapter with removable dust caps configured to accept a simplex fiber optic connector in each port.

Thousands of fiber optic adapters (40a) as depicted in FIG. 1 are deployed in data centers or data warehouses. Adapters have at least one port on the first side and an opposing port on the second side, called a simplex adapter configured to accept two simplex connectors. The duplex adapter (40a) has a mounting clip (41) secured about the adapter housing (45). Mounting clip (41) secures adapter (40a) in a panel (not shown) for use as described in the Summary. The width of a prior art duplex adapter (40a) is about 26.2 mm with an overall width of 30.7 mm from mounting hole to mounting hole formed as part of mounting clip (41). The duplex adapter is made up of two simplex adapters. As depicted in FIG. 1, the simplex adapter width is about 18.0 mm with an overall width of about 13.1 mm between mounting holds (not shown). When an adapter port is without a fiber optic connector (10, 12) (refer to FIG. 11), the adapter port is secured against debris with dust cap (22). There is a long-felt need to reduce the outer dimensions of the fiber optic adapter (40a) to allow more adapters deployed within a data centers' existing layout of adapter panels. In FIG. 1, this adapter is configured to accept a simplex fiber optic connector, which is a fiber optic connector having one ferrule, as opposed to a duplex fiber optic connector as shown in FIG. 12, with two ferrules formed with a ferrule flange (16a, 16b). The simplex connector is a single ferrule with an optical fiber therein handling transmission (Tx) and receiving (Rx) under the supervision of supporting electronics and software as is known in the prior art. Adapter (40a) has an overall length of 2LN1, where LN1 is determined by the type of adapter footprint such as SFP or SC.

Figures 5, 6:
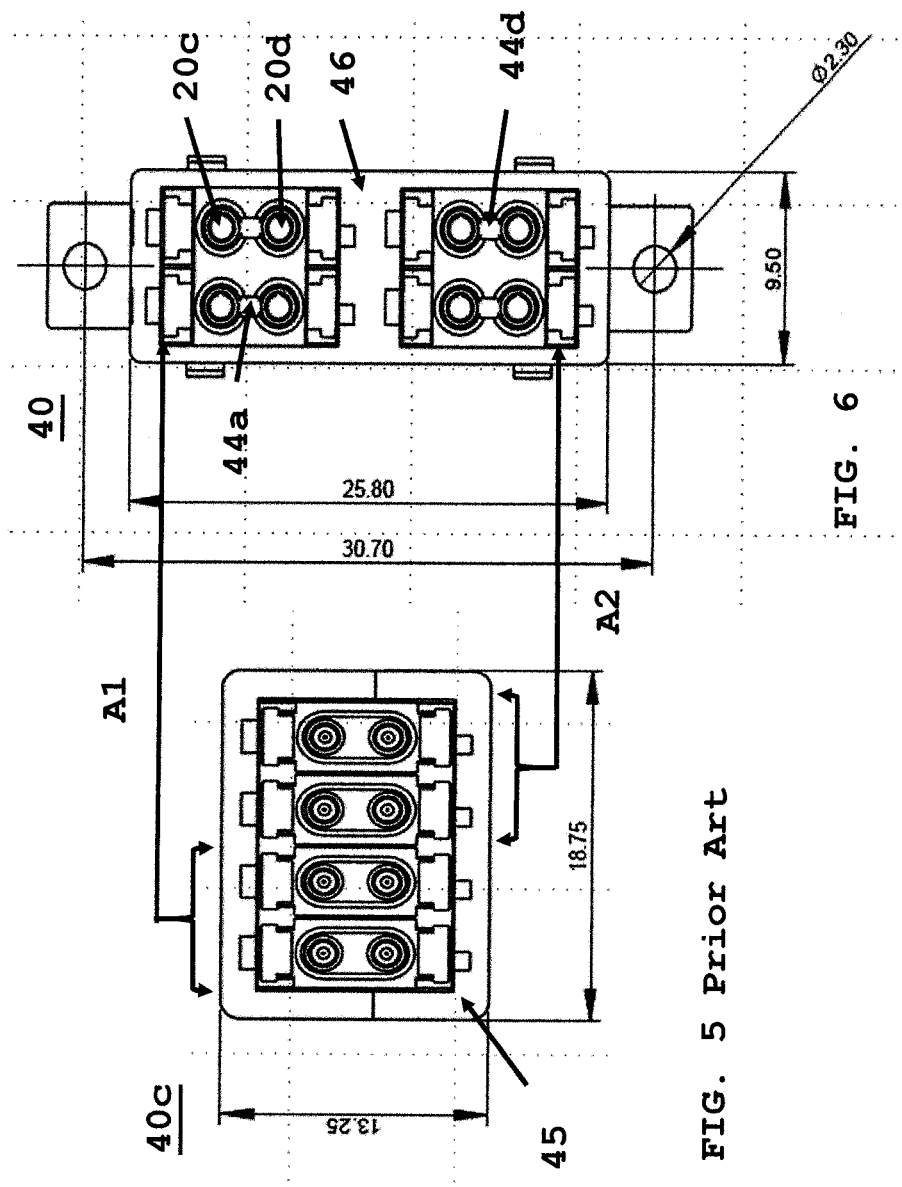
FIG. 5 depicts a prior art quad SFP adapter configured to accept four duplex fiber optic connectors.
FIG. 6 depicts a species of the first embodiment of the present invention configured to accept four duplex fiber optic connectors at a first end of the SC footprint adapter.

As represented in FIG. 2, a quad adapter is formed from a set of vertically stacked SC duplex adapters (40), as described in FIG. 6, and configured to accept a set of duplex fiber optic connectors (12). The first set of duplex fiber optic connectors (12) are accepted in a first port (40d.1). A second set of duplex fiber optic connectors (12) are accepted in a second port (40d.2). At an opposing port (40d.4) from port (40d.1) is a third set of duplex fiber optic connectors (12). The first set of connectors and the third set of fiber optic connectors form an optical signal communication pathway.

Figure 4:
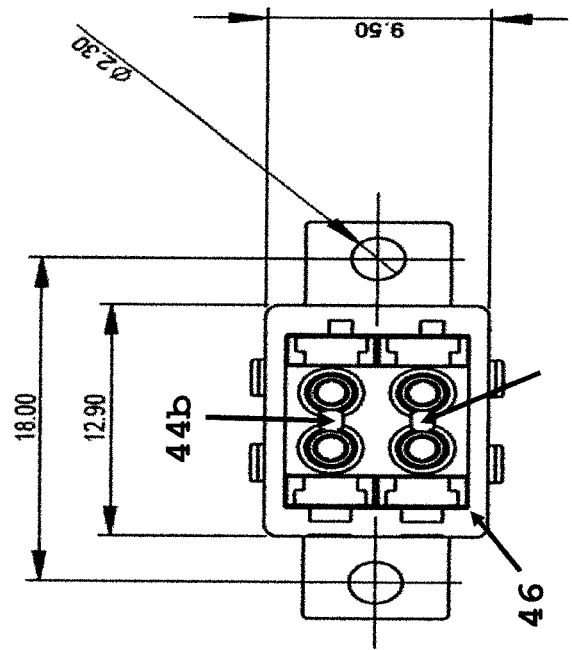
FIG. 4 depicts a first embodiment of the present invention configured to accept a set of duplex fiber optic connectors horizontally at a first end of a SC footprint adapter.
Figure 3:
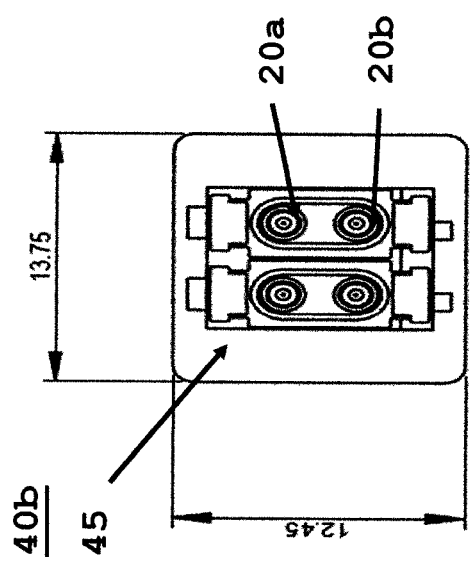
FIG. 3 depicts a prior art duplex SFP adapter configured to accept a set of duplex fiber optic connectors at a first end of the adapter.

FIG. 3 depicts a prior art adapter (40b) having a SFP foot print with outer dimensions of about 13.75 mm wide and 12.45 mm high where the alignment sleeve holder openings (20a, 20b) are vertically opposed. FIG. 4 depicts a first embodiment of the present invention as a SC footprint that is smaller in overall dimensions as opposed to the SFP footprint. As is known in the prior art, a SC footprint adapter is not sized or configured to accept one or more duplex fiber optic connectors (12) or one or more behind-the-wall fiber optic connectors (10). By reducing the overall dimensions, two duplex fiber optic connectors can be secured within an adapter having a SC footprint. To accommodate a decreased outer housing wall thickness (46), a bridge member (44a, 44b) is added between the alignment sleeve holder openings (20a, 20b) configured to accept a ferrule formed as part of ferrule assembly (16a, 16b) of a duplex fiber optic connector, refer to FIG. 12. Reducing the wall thickness (46) (also called reduced dimensional outer housing) allows for a reduction in overall dimensions when the duplex fiber optic connectors are inserted horizontal instead of vertical, as configured in FIG. 3. Converting from a SFP footprint adapter to SC footprint adapter to accept duplex fiber optic connectors reduces dimensional outer housing about 30%.

FIG. 5 is a prior art quad adapter (40c) made up of two SFP footprint duplex adapters with an overall width of about 18.75 mm and a height of about 13.25 mm. The first side of the adapter (40c) is configured to accept four duplex fiber optic connectors (10, 12). FIG. 6 is a species of FIG. 4. In FIG. 6, adapter (40) is configured as a quad adapter with reduced wall thickness (46), and bridge member (44a-44d) between alignment sleeve holder openings (20c, 20d) and likewise bridge member (44d) can be inserted between a set of alignment sleeve holder openings. FIG. 6 is SC quad adapter formed from a SFP footprint adapter by bridge members (44a-44d) and reduced wall thickness (46) and having the duplex fiber optic connectors installed vertical and side-by-side.

Figure 8:
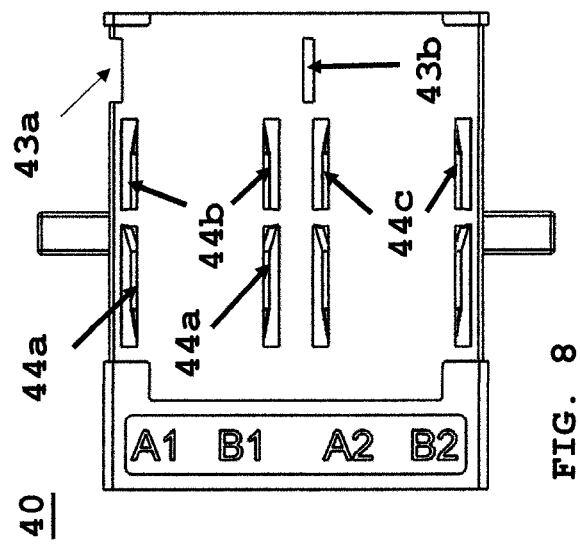
FIG. 8 is a top view of the adapter according to the first embodiment of the present invention configured to accept opposing fiber optic connectors as depicted in FIG. 9.
Figure 7:
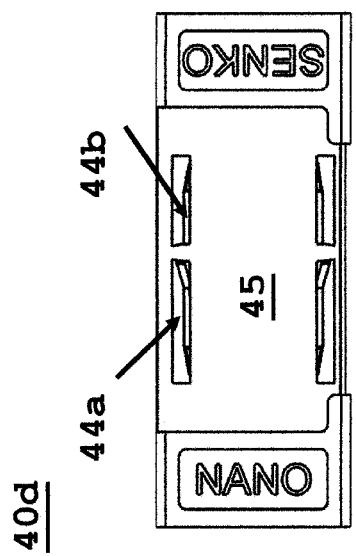
FIG. 7 is a top view of a prior art SFP adapter shown in FIG. 3.
Figure 9:
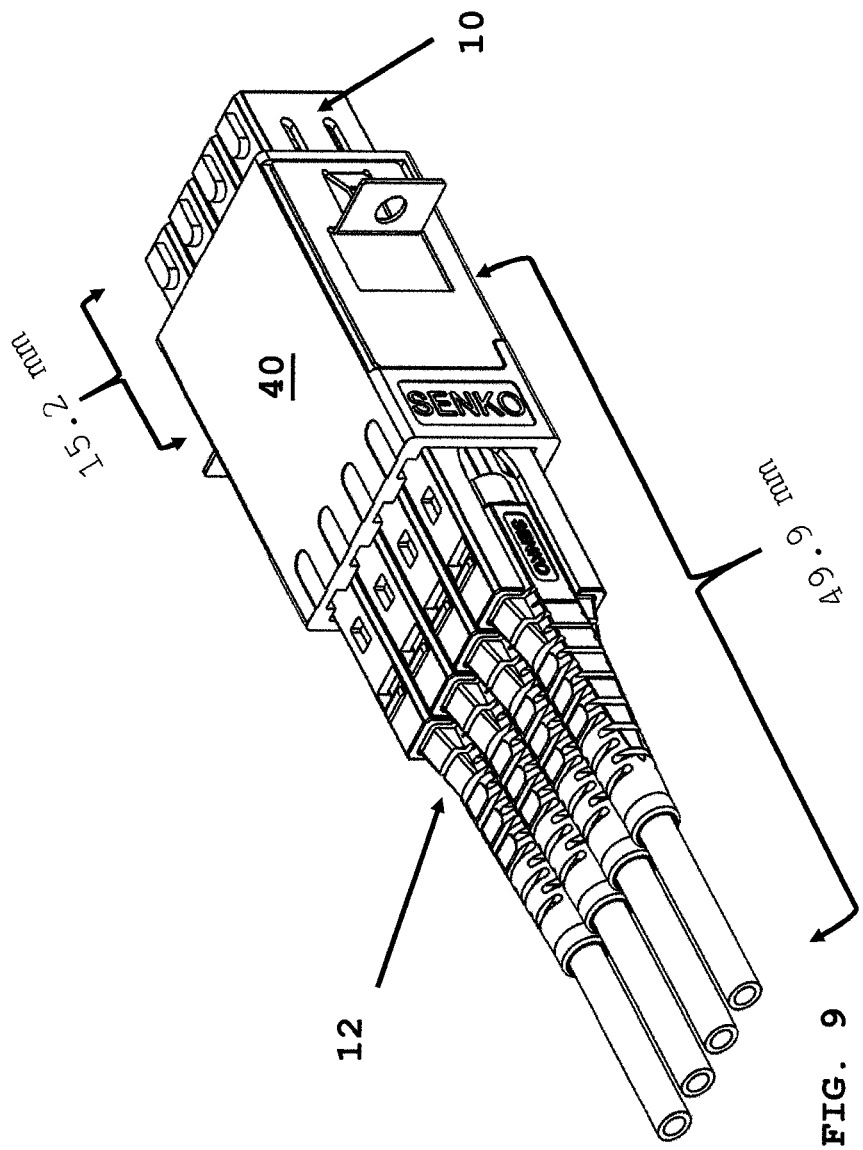
FIG. 9 is a perspective view of the fiber optic adapter according to the first embodiment configured with the duplex fiber optic connector received at the first end of the adapter and the behind-the-wall fiber optic connector received at the second end of the adapter.

FIG. 7 depicts a top view of prior art SFP adapter (40d) configured to accept opposing duplex fiber optic connectors (12) with connector latch hooks (44a, 44b) secured within the adapter housing (45). U.S. Pat. No. 10,281,668B2 discloses adapter (40d) with the latch hooks and duplex fiber optic connector (12). U.S. Pat. No. 10,281,668B2 is fully incorporated by reference and owned by the assignee of the present invention. FIG. 8 depicts a top view of a SC adapter according to the present invention, which is configured as described in FIG. 4 or FIG. 6. The first end of adapter is configured to accept fiber optic connector (12) and secured by latch hooks (44a) in a first port, and an opposing port with latch hook (44b) is configured to accept behind-the-wall connector (10) (refer to FIG. 12) and as shown FIG. 10. Cut-outs (43a, 43b) along with latch hooks (44b, 44c) secure two behind-the-wall connectors (10) side-by-side. FIG. 9 depicts a SC footprint adapter (40) reconfigured according to the first embodiment of the present invention with a plural of duplex fiber optic connectors (12) secured within a plural of ports along the first side of the adapter (40) and an opposing behind-the-wall fiber optic connector (10) within a plural of ports along a second side of the adapter (40). The opposing fiber optic connectors form an optical signal path. The length of the duplex fiber optic connector (12) is about 49.9 mm from the distal end of the boot to the proximal or ferrule tip of connector (12). The length of the behind-the-wall connector (10) is about 15.2 mm. This reduces the overall length of connector-adapter system that deployed opposing connectors (12) from about 100 mm down to about 34.5 mm in overall length, when deploying the behind-the-wall connector opposite the duplex fiber optic connector.

Figure 10:
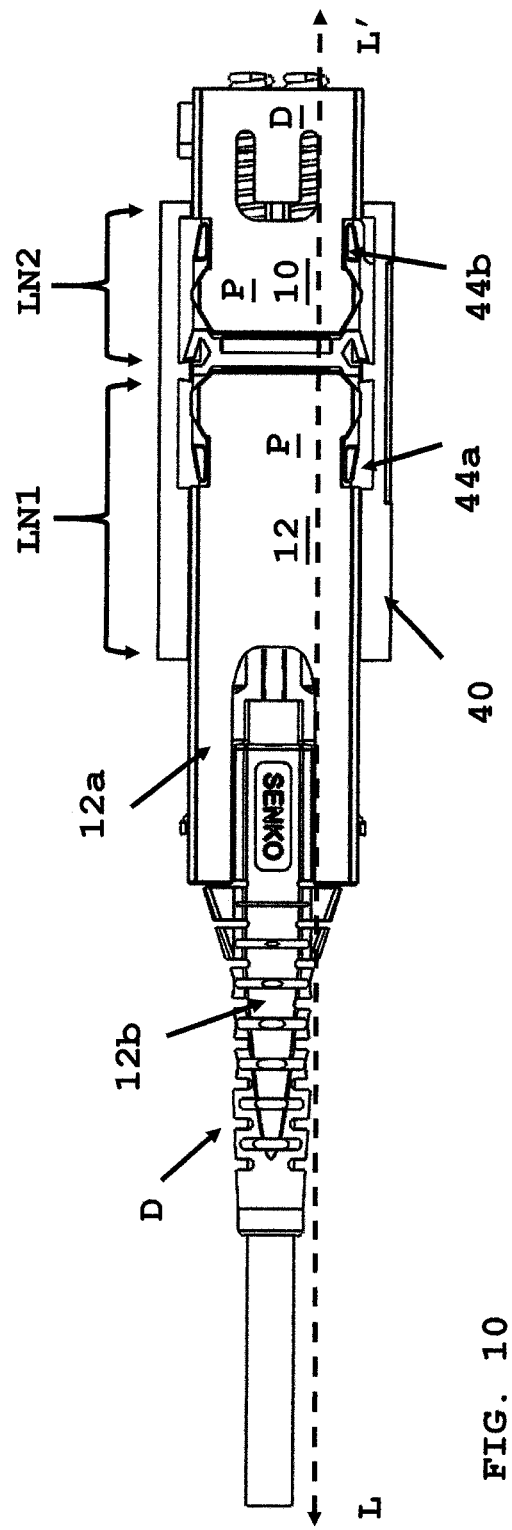
FIG. 10 is a cross-section view of FIG. 9.

FIG. 10 is a cross-section of FIG. 9. FIG. 10 depicts duplex fiber optic connector (12) opposing behind-the-wall fiber optic connector (10) where both fiber optic connectors are secured with their corresponding adapter port by opposing latch hooks (44a, 44b) respectively. The opposing fiber optic connectors form a longitudinal optical pathway (L-L') where an optical signal is delivered by an optical fiber contained within a fiber optic cable at a distal end (D) of the fiber optic connector (12) and transmitted through optical fibers embedded in the ferrules at proximal end (P) of the connector (12). The ferrules in connector (12) oppose the ferrules in connector (10) at proximal end (P) of the connector (10) and proximal end of connector (12). The SC footprint adapter is further reduced in overall dimensions by deploying a behind-the-wall fiber optic connector (10-10d), where the adapter housing at the first end is of length (LN1) and at the second end, the adapter housing is of length (LN2), where LN2 is less than LN1. The overall length of LN1 and LN2 is about 25.7 mm whereas adapter (40a) is about 34.5 mm. The length reduction is about 9.2 mm when deploying the behind-the-wall connector (10-10d) within the ports along one side of adapter (40).

Figure 11:
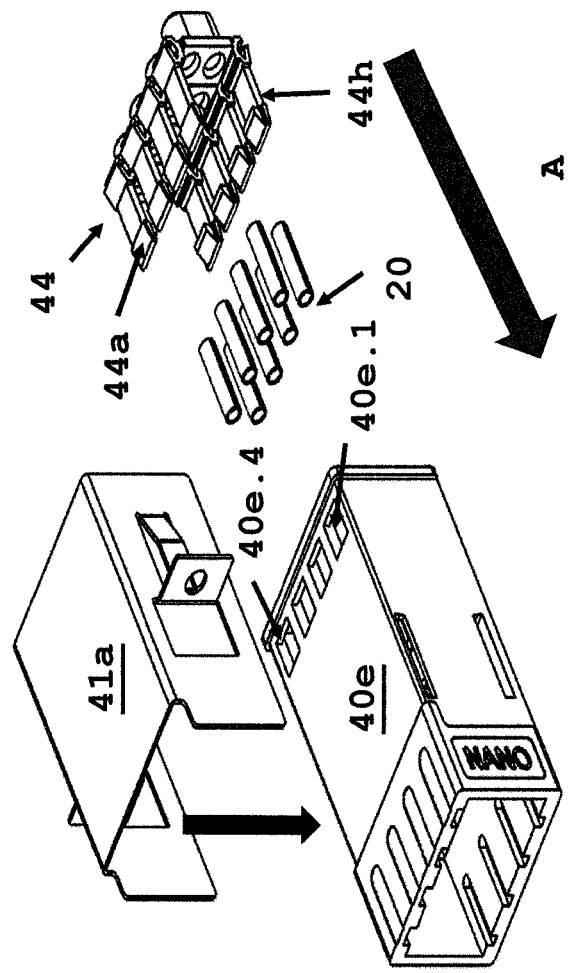
FIG. 11 is a perspective view of a species of the fiber optic adapter of FIG. 11 without the fiber optic connectors secured within the port of the adapter.
Figure 12:
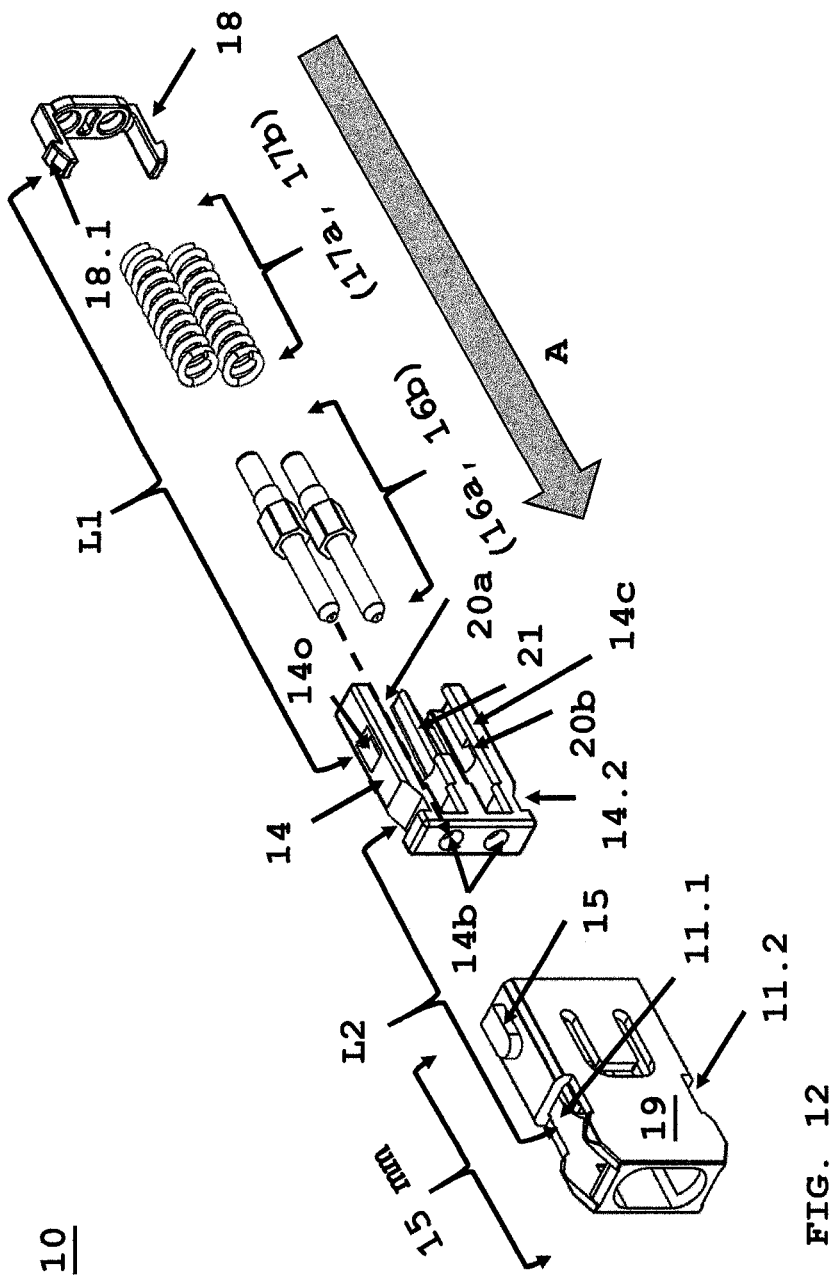
FIG. 12 is an exploded view of a first embodiment of the behind-the-wall fiber optic connector.
Figure 14:
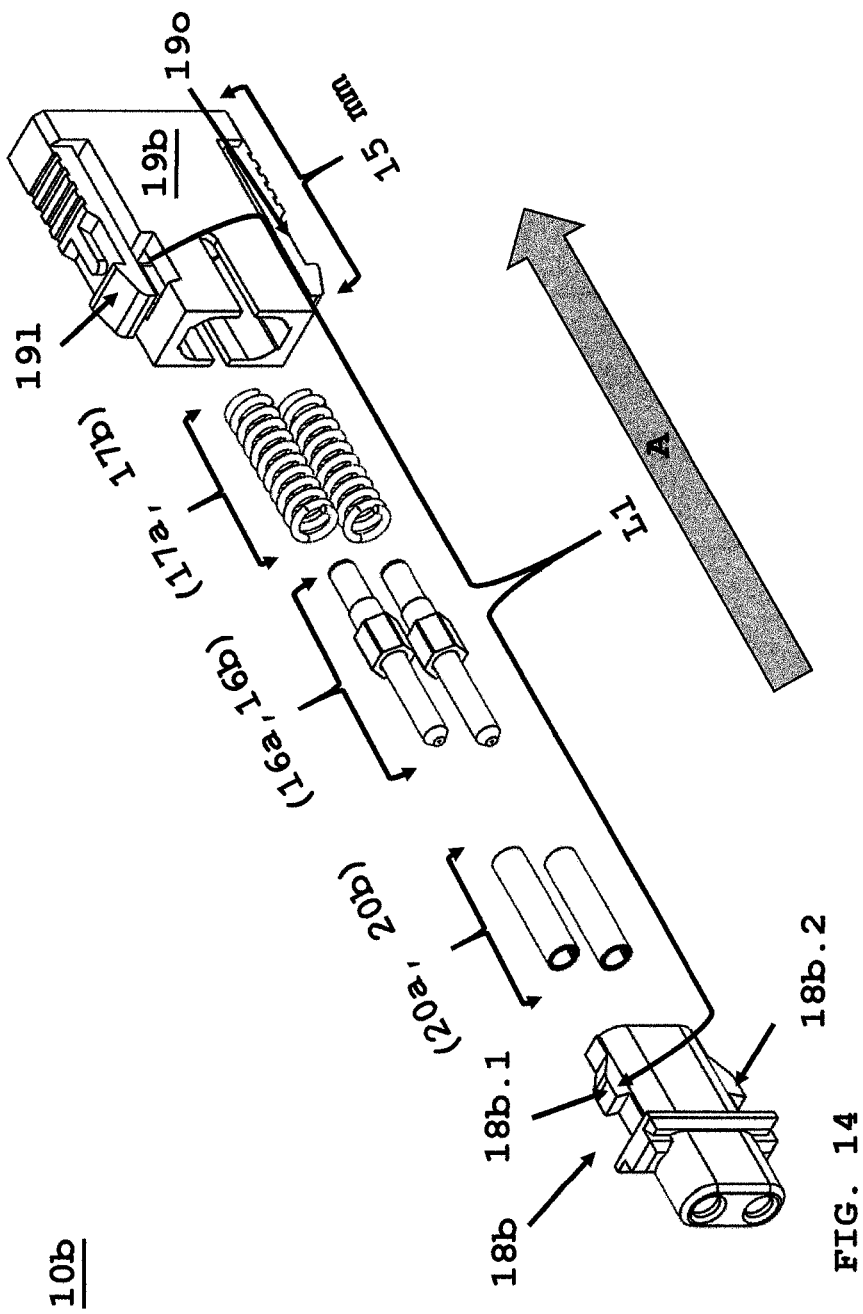
FIG. 14 is an exploded view of a third embodiment of the behind-the-wall fiber optic connector.
Figure 15:
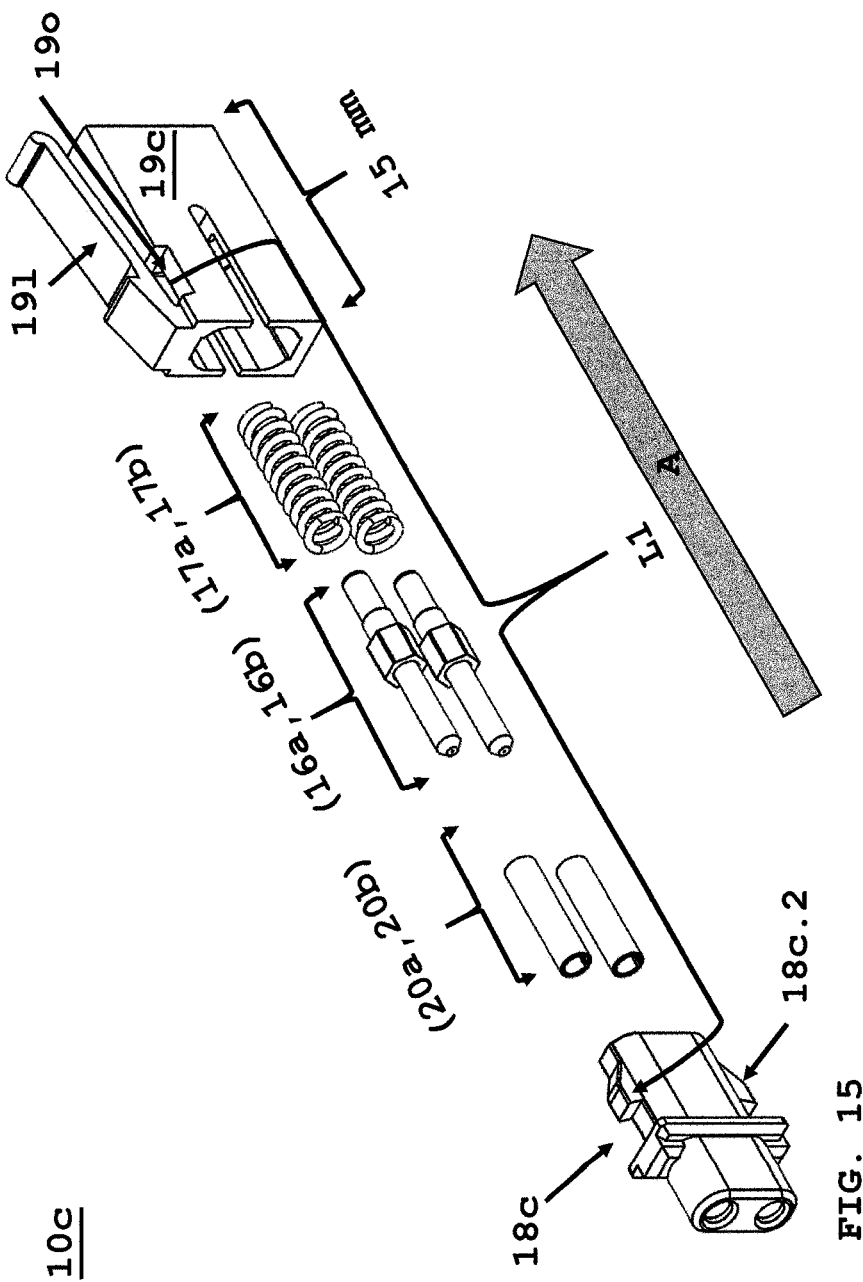
FIG. 15 is an exploded view of a fourth embodiment of the behind-the-wall fiber optic connector.
Figure 16:
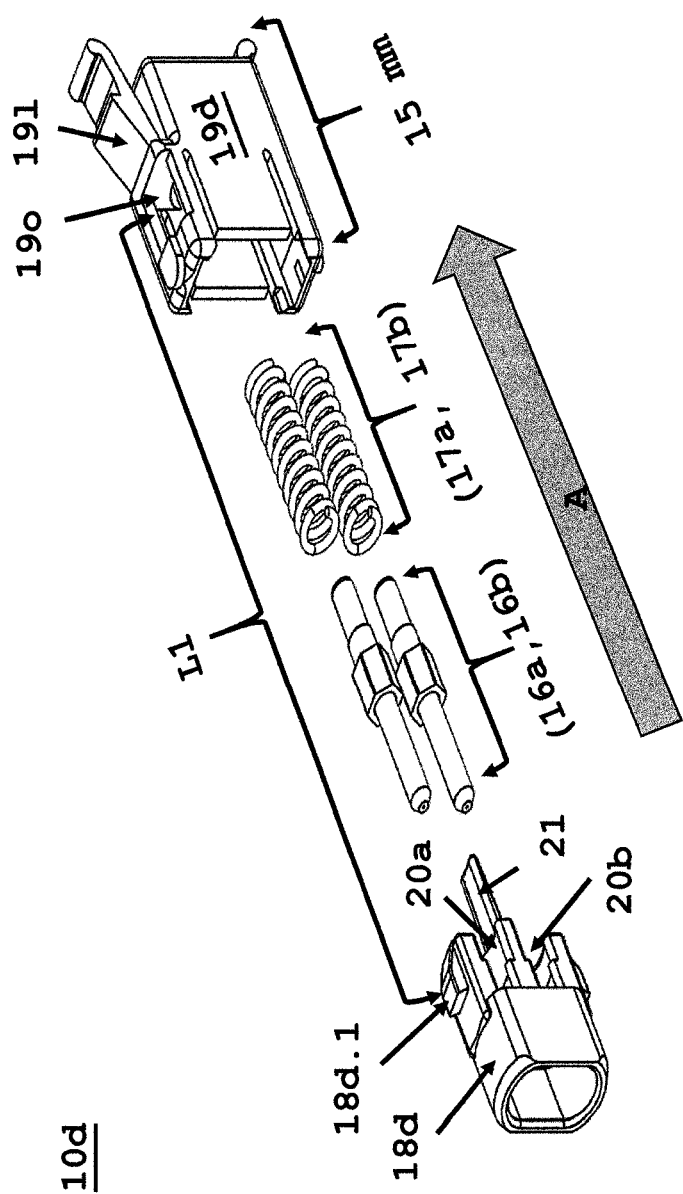
FIG. 16 is an exploded view of a fifth embodiment of the behind-the-wall fiber optic connector, and Corresponding reference numbers indicate corresponding parts throughout the drawings.

FIG. 11 depicts another embodiment of adapter (40). FIG. 11 SC foot print adapter (40e) comprises latch hook assembly (44) with plural of latch hooks (44a-44h) at the proximal end of the assembly (44). The latch hooks are configured to accept a corresponding duplex fiber optic connector (12) between an opposing pair of latch hook. The latch hook assembly (44) is inserted into and secured within a second side of the adapter (40) in the direction of the arrow (A). An adapter latch recess (40e.1-40e.4) is configured to accept and to secure a behind-the-wall fiber optic connector (10b, 10c, 10d) as depicted in FIGS. 14-16. Latch (191) formed as part of the outer housing of the behind-the-wall connector is accepted in the latch recess.

FIGS. 12-16 depict embodiments of the behind-the-wall connector that when deployed with the SFP adapter or SC adapter can reduce the overall length of the connector-adapter assembly by about 9.2 mm. The length reduction is accomplished by removing connector outer housing (12a) and cable boot (12b), and replacing with an inner body, the inner body is formed as an integrated inner body or a two-piece inner body. The behind-the-wall connector is assembled with a set of ferrule assembly (16a, 16b), bias springs (17a, 17b) and a pair of alignment sleeve holder openings (20a, 20b) that accept a proximal end of the ferrule. The alignment sleeve holder openings receive the ferrule protruding from the proximal end of the ferrule assembly. In some embodiments, the outer housing has an external latch that cooperates with an adapter latch recess, depicted in FIG. 11.

FIG. 12 depicts an exploded view of behind-the-wall fiber optic connector (10). Connector (10) comprises an outer housing (19) with opposing cut-outs (11.1, 11.2) at the proximal end of the housing (19). Outer housing (19) is about 15 mm. The outer housing further comprises an alignment key (15) that orients connector (10) within a port of adapter (40). Inner body (14) accepts external hook body (18) along latch line (L1) when hook (18.1) is secured within opening (14o) formed within each outer wall (14c). Inner body (12) is secured within outer housing (19) when recess cut-outs (14.1, 14.2) are received in opposing body cut-outs (11.1. 11.2) along latch line (L2). When assembled in direction of arrow (A), behind-the-wall connector (10) is assembled. In this embodiment, the alignment sleeve holder openings (20a, 20b) have no sidewalls. Shelf (21) extends from a proximal end of the inner body and accepts the ferrule assembly up to proximal end of the ferrule flange. When the ferrule assembly (16a, 16b) is fully inserted with inner body (14), the ferrule protrudes through an opening (14b) (as shown by the dashed arrow), which is the alignment sleeve holder opening. In the configuration, the inner front body having open sidewalls with a shelf (21) allows for the removal of the alignment sleeves, as depicted in FIG. 12.

Figure 13:
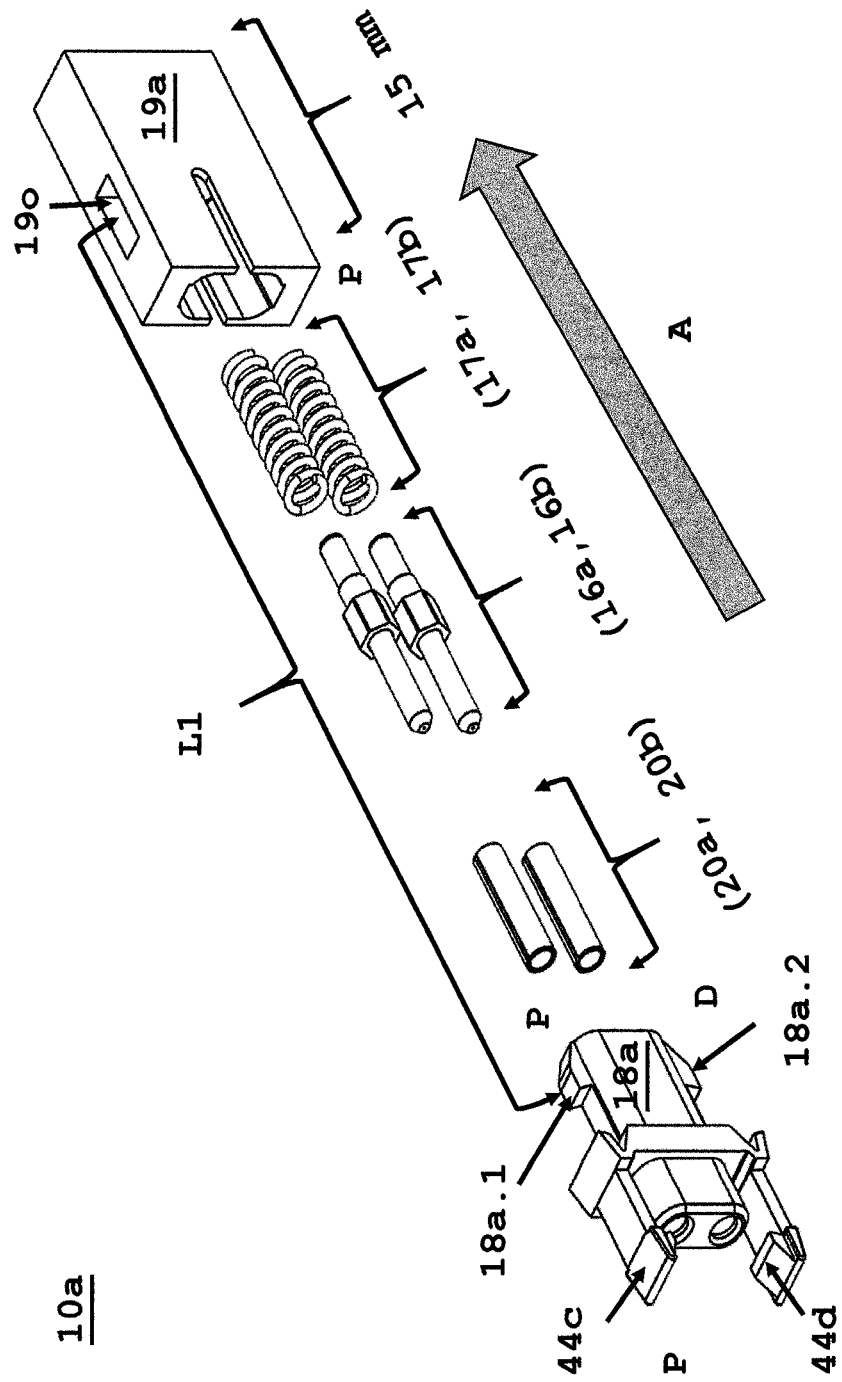
FIG. 13 is an exploded view of a second embodiment of the behind-the-wall fiber optic connector.

FIG. 13 depicts a second embodiment of behind-the-wall connector (10a). Connector (10a) deploys an integrated inner body (18a). Inner body (18a) comprises a pair of opposing latch hooks (44c, 44d) at a proximal end (P) of the assembled connector (10a). The latch hook assembly (44). The distal end (D) has opposing protrusions (18a.1, 18a.2), received in opening (19o) formed on opposing sides of outer housing (19a). Outer housing (19a) is about 15 mm in length. When assembled in direction of arrow (A), integrated inner body (18a) accepts alignment sleeves (20a, 20b) at the distal end of the inner body (18a). The alignment sleeves (20a, 20b) accept a corresponding ferrule at a proximal end (P) of each ferrule assembly (16a, 16b), and a pair of bias springs (17a, 17b) are received at a distal end (D) of the ferrule assembly (16a, 16b) and bias each ferrule assembly forward. The adapter hook (18a.1, 18a.2) is integrated or formed as part of the inner body (18a). In this embodiment, alignment sleeves (20a, 20b) are inserted into openings at a distal end of inner body (18a), which acts as an alignment sleeve holder. The alignment sleeve holder openings are at the proximal end (P) of the alignment sleeves.

FIGS. 14-16 are exploded views that depict an outer housing (19b-19d) with an external reverse release latch (191) that is received within a latch recess (40e.1-40e.4) formed at one end of an adapter. The external latch allows a user to depress the latch and remove the behind-the-wall connector (10b-10d) from its corresponding adapter latch recess (40e.1-40e.4). For connector (10b), protrusion (18b.1, 18b.2) formed as part of inner body (18b) are received in opening (19o) formed on one-side of outer housing (19b), which is about 15 mm in length, along latch line (L1) to assemble connector (10b) along arrow (A). FIG. 14 alignment sleeve holder openings are similarly configured as described in FIG. 13.

FIG. 15 depicts a third embodiment of the behind-the-wall connector (10c). Inner body (18c) has opposing protrusions (18c.1, 18c.2) form connector (10c), when the protrusions are received with openings (19o) formed as part of connector outer housing (19c). Outer housing (19c) is about 15 mm in length. Release latch (191) allows a user to remove assembled connector (10c) from its adapter port recess (40e.1-40e.4). FIG. 15 alignment sleeve holder openings are similarly configured as described in FIG. 13.

FIG. 16 depicts an exploded view of behind-the-wall connector (10d) with an external latch (19l) positioned at the most distal end (D) of connector housing (19d). Unlike release latch (19l) of FIG. 15, which is disposed at the most proximal end (P) of the outer housing (19d). Outer housing (19d) length is about 15 mm. Connector (10d) is formed when protrusions (18d.1, 18d.2) are received in opening (19o) on opposing sides of connector outer housing (19d) along latch line (L1), to form the connector (10d) when assembled in direction of arrow (A). Unlike FIG. 15 alignment sleeves (20a, 20b), the alignment sleeves of connector (10d) are formed as part of inner body (18d), and like FIG. 12, the open alignment sleeve allows from more clearance when assembling the connector. Alignment sleeve holder openings in FIG. 16 are similar configured as described in FIG. 12. FIG. 16 inner body (18d) is similar constructed as FIG. 12 inner body (18a), with open sidewalls and an inner shelf (21).

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A fiber optic adapter assembly, comprising:
an outer housing having a reduced outer wall thickness, the outer housing having a first side wall, a second side wall, and a width extending from the first side wall to the second side wall, the outer housing having a first end wall, a second end wall, and a height extending from the first end wall to the second end wall, the first side wall, the second side wall, the first end wall, and the second end wall defining a generally rectangular receptacle including a first duplex connector port and a second duplex connector port, the first duplex connector port being above the second duplex connector port along the height, the generally rectangular receptacle being non-partitioned such that the first duplex connector port is open to the second duplex connector port and the fiber optic adapter assembly is free of any wall inside the generally rectangular receptacle extending from the first side wall to the second side wall;
a first pair of opposing alignment sleeve holder openings including a first alignment sleeve holder opening and a second alignment sleeve holder opening, the first pair of alignment sleeve holder openings being located in the first duplex connector port and being connected with a first bridge member between the first alignment sleeve holder opening and the second alignment sleeve holder opening;
a second pair of opposing alignment sleeve holder openings including a third alignment sleeve holder opening and a fourth alignment sleeve holder opening, the second pair of alignment sleeve holder openings being located in the second duplex connector port and being connected with a second bridge member between the third alignment sleeve holder opening and the fourth alignment sleeve holder opening;
wherein a width of the outer housing is less than or equal to about 12.90 mm and a height of the outer housing is less than or equal to about 9.50 mm; and
wherein the width is greater than the height.

2. The fiber optic adapter assembly according to claim 1, wherein the outer housing has a first port side and a second port side opposite the first port side, the first and second duplex connector ports opening through the first port side, the fiber optic adapter assembly further comprising third and fourth duplex connector ports opening through the second port side, wherein the fiber optic adapter assembly is configured to mate with first and second duplex fiber optic connectors in the first and second duplex connector ports and wherein the fiber optic adapter assembly is configured to mate with third and fourth duplex fiber optic connectors in the third and fourth duplex connector ports.

3. The fiber optic adapter assembly according to claim 2, wherein the first, second, third, and fourth duplex fiber optic connectors are the same type of the duplex fiber optic connector.

4. The fiber optic adapter assembly according to claim 2, wherein the first and second duplex fiber optic connectors are a first type of duplex fiber optic connector and the third and fourth fiber optic connectors are a second type of duplex fiber optic connector, wherein the second type of duplex fiber optic connector is a behind-the-wall fiber optic connector.

5. The fiber optic adapter assembly according to claim 1, wherein the outer housing further comprises a mounting clip, the mounting clip having a widthwise dimension greater than the width of the housing, the widthwise dimension of the mounting clip being less than about 18.0 mm.

6. The fiber optic adapter assembly according to claim 4, wherein the behind-the-wall connector further comprises a release latch formed as part of the outer housing for releasably securing the behind-the-wall connector within a port of the adapter.

7. The fiber optic adapter assembly according to claim 6, wherein the outer housing is configured to receive an inner body in each of the third and fourth duplex connector ports, each inner body comprising a pair of opposing protrusions, the first and second side walls of the outer housing defining a pair of opposing openings for each inner body, each pair of opposing protrusions being arranged to latch with the respective pair of openings.

8. The fiber optic adapter assembly according to claim 1 wherein the outer housing is configured to receive two duplex fiber optic connectors in a simplex SC footprint.

9. The fiber optic adapter assembly as set forth in claim 1, wherein the first side wall defines first and second keyways for the first and second duplex connector ports, respectively.

10. The fiber optic connector assembly as set forth in claim 9, wherein the second side wall defines third and fourth keyways for the first and second duplex connector ports, respectively.

11. The fiber optic connector assembly as set forth in claim 10, wherein each of the first and second keyways has a first cross-sectional size and each of the third and fourth keyways has a second cross-sectional size less than the first cross-sectional size.

12. The fiber optic connector assembly as set forth in claim 1, further comprising a first pair of opposing adapter latch hooks in the first duplex connector port and a second pair of opposing adapter latch hooks in the second duplex connector port.

* * * * *